United States Patent Office 2,807,880
Patented Oct. 1, 1957

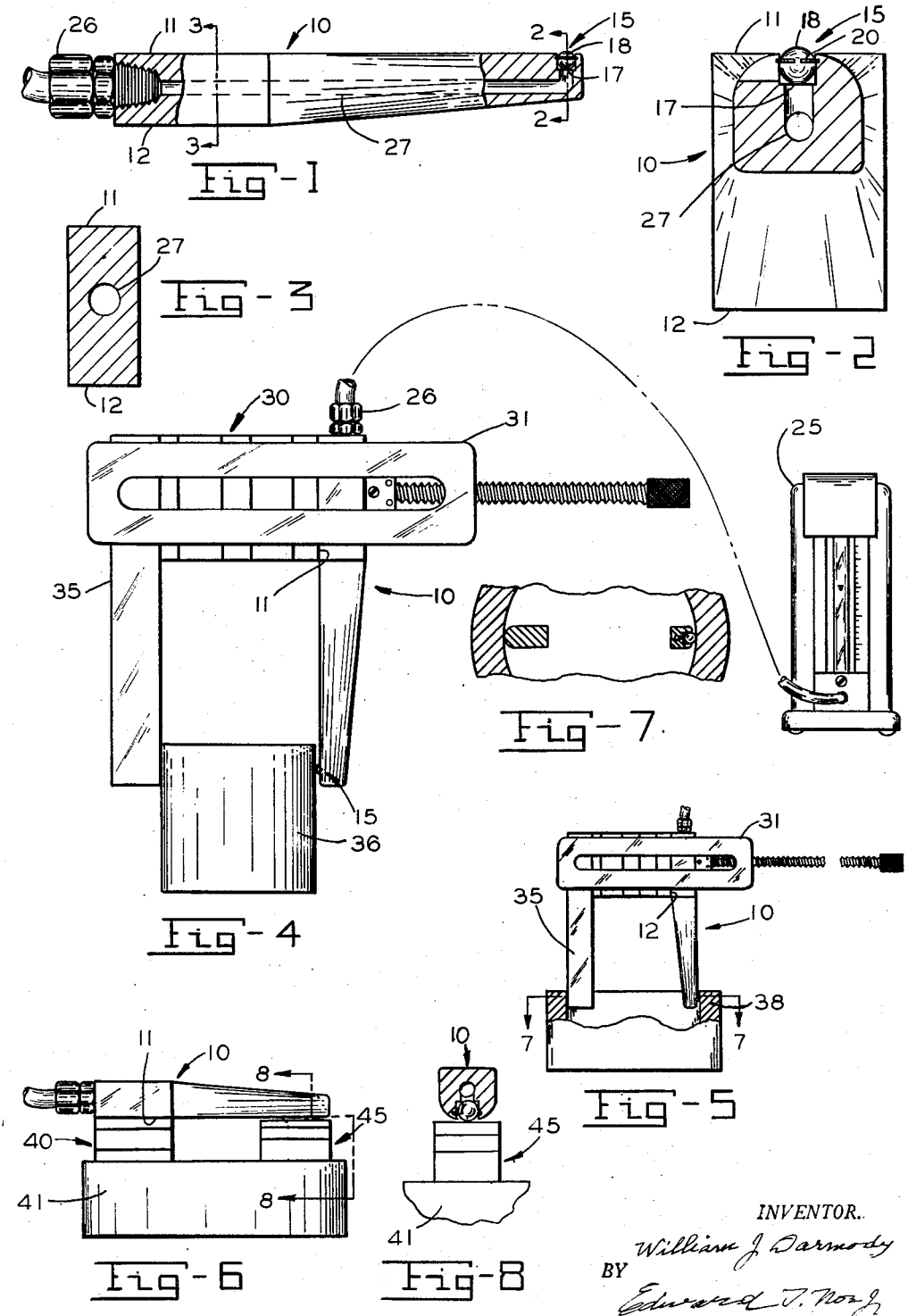

2,807,880

PNEUMATIC GAGE

William J. Darmody, Washington, D. C., assignor, by mesne assignments, to The Sheffield Corporation, a corporation of Delaware Application December 21, 1954, Serial No. 476,661

6 Claims. (Cl. 33—147)

This invention relates to gauging devices and more particularly to an accessory for use with gauge block sets and gauge block holders.

Gauge block sets, such as those of the Johannson and Hoke types, are commonly utilized with accessory or attachment sets providing calipering jaws or gauging arms which are clamped about previously wrung gauge block stacks by holders to form gauging devices of a fixed character. By assembling the gauging arms about a proper gauge block stack, calipering means can be provided for both internal and external measurements. However, in such devices the contacting force limits the precision of measurement and the precision of gauging is dependent upon the sense of touch of the operator. Furthermore, such assembled devices have no range in gauging and must be disassembled and reassembled with new gauge block stacks for each change in a part dimension, no matter how small.

It is accordingly the primary object of this invention to provide an accessory for ready assembly with existing gauge block and accessory holders to form a precision gauging device which is economically adaptable to gauging part dimensions in a more precise manner regardless of the judgment or sense of feel of the operator and with a minimum contacting force in gauging.

It is a further object to provide an accessory for ready assembly with gauge block stacks and gauge block holders to form a precision gauging assembly having the necessary measuring range to cover the dimensional variation found in a geometrical feature, thus avoiding the necessity for a separate combination of gauge blocks for every dimension gauged.

It is a further object to provide an accessory for attachment at one end of a gauge block stack as one arm of a precision dimension calipering assembly, wherein the accessory has a highly finished gauge block surface for wringing engagement with the gauge block face at one end of the stack and includes air leakage gauging means for operative association with a part surface, the gauging means being adapted for connection to existing gauging instruments of high amplification, whereby precision gauging assemblies can be readily and economically provided which give more accurate gauging presentations with a precision comparable to that of the gauge blocks with which the accessory is assembled.

Other objects and advantages of the invention will be apparent from the following description, the appended claims, and the accompanying drawing, in which, Figure 1 is a view of an accessory adapted for use with gauge block accessory sets and embodying the features of this invention, Figures 2 and 3 are sectional views of the unit taken on lines 2—2 and 3—3, respectively, of Figure 1, Figure 4 discloses the unit of Figure 1 assembled with a gauge block stack and holder to form a precision calipering assembly, Figure 5 illustrates a similar assembly adapted for gauging internal dimensions, Figure 6 illustrates a step in a procedure for setting up the unit of this invention for gauging, and Figures 7 and 8 are sectional views on lines 7—7, 8—8 of Figures 5 and 6, respectively.

Existing gauge block sets of Johansson, Hoke and other types are commonly utilized with accessory sets. Gauging arms are provided in these accessory sets which are clamped at each end of gauge block build-ups by means of a holder to form rigid calipering arrangements for internal or external dimensions. The accuracy of gauging with such assemblies is dependent entirely upon the contacting pressure and the feel and judgment of the operator. Such arrangements are only used for one particular gauging operation and must be disassembled and assembled with other gauge block stacks for gauging the slightest change in dimension.

The present invention provides a gauging arm or unit for assembly with gauging block stacks in lieu of one or both of the caliper jaws to readily provide a precision gauging assembly giving precision gauging results regardless of operator feel or judgment and over a substantial range of part dimensions in a single assembly.

In the unit of this invention one end has a configuration similar to that of the gauge blocks with which it is to be assembled and includes a lapped and polished gauge block like surface for engagement with the end measuring surface of the gauge block at one end of a gauge block stack as by wringing. The unit is elongated and projects beyond the gauge blocks with which it is assembled and at its projecting end it carries a gauging means for association with the part surface.

In the particular unit illustrated the gauging means comprises a leakage orifice controlled by a work contactor formed as freely rotatable ball carried outward of the orifice for engagement with the part surface. It will be understood that other similar gauging means can also be utilized. For example, where flat surfaces or surfaces of large curvature are to be gauged open air leakage orifices can be utilized.

The gauging means is adapted for connection to an indicating instrument having an indicator responding with a precision comparable with that of the gauge blocks with which the accessory is utilized. Where internal measurements are to be made, the gauging means will face outward relative to the stack with which it is assembled; and conversely where external measurements are made the gauging means will face inwardly.

The particular unit disclosed comprises an integral elongated body 10. This body 10 has a configuration at one end which is similar to that of the gauge blocks with which the unit will be assembled. The unit illustrated is adaptable for use in both internal and external measurements and therefore will have surfaces at 11 and 12 which are lapped and polished to optical flatness for wringing engagement with gauge block measuring surfaces. The surfaces 11 and 12 will also have outlines and areas identical to that of the measuring surface of the gauge block which they will engage in assembly.

The body 10 is tapered and rounded and at the other end thereof a gauging means 15 is provided. The particular gauging means disclosed comprised an air leakage orifice 17 formed in depressed relationship to the face of the body 10. A freely rotatable ball 18 acts as a work contactor and is carried in the body 10 outwardly of the orifice 17 for engagement with the part surface. The ball is retained within the unit by an inserted snap ring 20.

Air from a source under controlled pressure passes through an indicating instrument, such as that indicated at 25, a coupling 26, a passage 27 formed within the body 10 and to orifice 17. Displacements of the work surface and concurrent movements of the work contacting ball 18 will control the fluid leakage through the orifice 17. The leakage will be indicated by the instrument 25 to give an amplified representation of the work displacements relative to the surface of the unit.

In Figure 4 the unit is disclosed as assembled at one end of a wrung gauge block stack 30 by means of a holder 31. The unit cooperates with a conventional gauging jaw 35 in this particular application for gauging the external diameter of a cylindrical part 36. It will be seen that through the utilization of different gauge block stacks 30, similar calipering arrangements can be readily fashioned for a wide range of part dimensions. Through the inherent range of the gauging means 15, a gauging assembly is provided which will accurately gauge a substantial range of part dimensions without the necessity of disassembling the apparatus and reassembling it with a different gauge block stack. The gauging instrument will accurately indicate in an amplified manner the size of a part, and the assembly is useful for precision gauging without any dependence whatsoever on the feel or judgment of the operator and without excessive contacting pressure.

In Figure 5 the unit is disclosed as assembled for gauging the internal dimension of a part 38. It will be seen that the gauge block like surface 12 is then in engagement with the gauge block stack.

A single unit as provided by this invention can be used in cooperation with a conventional calipering jaw 35 or a pair of such units could be assembled about an interposed gauge block stack. When a pair of cooperating units are used they can be connected to a common instrument responsive to the total flow through both units. Where other gauge block configurations than those disclosed are involved, the configuration of the unit is simply modified to correspond thereto.

The accessory unit of this invention is accurately set up in a simple manner for gauging prior to its assembly with the gauge blocks and holder. In Figure 6 the unit is being set up for gauging an external dimension. In this setup procedure, a predetermined gauge block stack is inserted at 40 between an optical flat 41 and the accessory unit. This build-up remains in position throughout the calibration procedure. When an instrument such as is indicated at 25 is utilized having both amplification and indicator adjustments, two gauge block build-ups are placed at 45 which differ in height by a substantial portion of the gauging range. With these gauge block build-ups alternatively in place and in controlling engagement with the ball 18, the instrument is adjusted so that the indicating float responds accurately along the provided scale.

In a setup for internal gauging the unit would be mounted facing upward with its surface 12 engaging the upper surface of the optical flat 41. Gauge block build-ups are then alternatively placed on the upper surface of the optical flat 41 to extend over the unit into engagement with the ball 18. A similar procedure would then be followed in adjusting the instrument.

Thus it is seen that an accessory has been provided for use with existing gauge blocks and gauge block accessory sets which will give more accurate and more sensitive measurements without relying on the feel or judgment of the operator. The unit also provides a means for obtaining greater range with one setup of gauge blocks so that it is not necessary to tear down and reassemble and have so many combinations of gauge block stacks. The unit is simply manufactured in an economical manner, is easily set up for gauging, and can be conformed for use with various types of gauge blocks and gauge block accessories.

While the form of apparatus herein described constitutes a preferred embodiment of the invention, it is to be understood that the invention is not limited to the precise form herein disclosed, and that changes may be made therein without departing from the scope of the invention which is defined in the appended claims.

What is claimed is:

1. An accessory for attachment at one end of a gauge block stack as one arm of a precision dimension calipering assembly, said accessory comprising an elongated unit having one end commensurate in size and shape with a gauge block, said end having a gauge block-like surface along one side thereof finished for wringing engagement with the exposed measuring surface of an end block of a gauge block stack, said unit having air leakage gauging means adjacent the other end thereof remote from said one end for support laterally with respect to the length of a gauge block stack and situation in opposition to a surface of the part to be gauged and controlled by part displacements along a line perpendicular to the plane defined by the unit gauge block surface, said unit having a passage therein communicating with said air leakage gauging means and adapted for connection to a source of air under pressure and an air gauge.

2. An accessory for attachment at one end of a gauge block stack as one arm of a precision dimension calipering assembly, said accessory comprising an elongated unit having a gauge block-like surface at one end along a portion of one elongated side thereof, said surface being finished for wringing engagement with the exposed measuring surface of an end block of a gauge block stack, said unit extending from said one end laterally of the length of a gauge block stack and having gauging means adjacent the other end thereof remote from the stack and displaced along the length of the unit beyond the gauge block-like surface for sensing parts displacements along a line perpendicular to the plane defined by the unit gauge block surface and toward and from a second gauging arm at the other end of the stack, said gauging means comprising a fluid leakage orifice and a work contactor for engaging a surface of the part being gauged and controlling the leakage through the orifice in accordance with the displacements thereof, and passage means communicating with said orifice and adapted for connection to a source of air under controlled pressure and an air gauge.

3. An accessory for attachment at one end of a gauge block stack for cooperation with means at the other end of the stack to form a precision assembly for gauging a dimension of a part, said accessory comprising a unit having a gauge block-like surface finished for wringing engagement with an exposed measuring surface of an end block of the gauge block stack, said unit having air leakage gauging means including an orifice adapted for connection to a source of air under pressure and an opposing work contactor movable along a line perpendicular to the plane defined by the unit gauge block like surface.

4. An accessory for assembly at one end of a gauge block stack for cooperation with a gauging arm at the other end thereof to form a precision dimension calipering device for gauging internal part dimensions, said accessory comprising an elongated unit having a gauge block-like surface at one end along a portion of one elongated side thereof, said surface being finished for wringing engagement with the exposed measuring surface of an end block of a gauge block stack and having an outline corresponding to said measuring surface, said unit comprising gauging means adjacent the other end thereof for support laterally of the length of a gauge block stack and facing in the opposite direction from the gauge block-like surface, said gauging means comprising an air leakage orifice, work contacting means carried at the outlet of said orifice and adapted for engagement with a surface of the part being gauged, whereby the leakage through said orifice is controlled by the part dimension, and passage means communicating with said orifice and adapted for connection to a source of air under controlled pressure and an air gauge.

5. An accessory for assembly at one end of a gauge block stack and extent laterally of the stack for cooperation with a gauging arm at the other end to form a precision dimension calipering device for gauging the external dimension between part surfaces, said accessory comprising an elongated unit having one end commensurate in size and shape with a gauge block, said end having a gauge block-like surface along one side thereof finished for wringing engagement with the exposed measuring surface of an end block of a gauge block stack and having an outline corresponding to said measuring surface, said unit comprising gauging means adjacent the other end thereof for support laterally remote from the length of a gauge block stack and facing in the same direction as the gauge block-like surface of the unit, said gauging means comprising an air leakage orifice and work contacting means carried at the outlet of said orifice provided for engagement with the part surface, whereby the leakage through said orifice is controlled in accordance with the workpiece dimension gauged.

6. An accessory for assembly at one end of a gauge block stack for cooperation with a gauging arm at the other end thereof to form a precision dimension calipering device, said accessory comprising an elongated integral unit having a gauge block-like surface at one end thereof along a portion of one elongated side, said surface being finished for wringing engagement with the exposed measuring surface of an end block of a gauge block stack and having an outline corresponding to said measuring surface, the opposite surface of said unit being provided for engagement by assembly clamping means, said unit extending laterally of the stack and comprising gauging means adjacent the other end thereof remote from said gauge block-like surface for sensing part displacements along a line perpendicular to the plane defined by the unit gauge block surface, said gauging means comprising an air leakage orifice provided in the unit surface and in depressed relationship thereto, a freely rotatable ball contactor carried in said unit at the outlet of said orifice and adapted for engagement with the part surface, retaining means in said unit retaining said ball in freely rotatable relationship and guiding it for movement to and from said orifice outlet, said unit including passage means communicating with said orifice and adapted for connection to a source of air under controlled pressure and an air gauge, whereby the leakage through said orifice to atmosphere is controlled in accordance with a gauged product dimension.

References Cited in the file of this patent

UNITED STATES PATENTS

| | | |
|---|---|---|
| 2,693,037 | Fox | Nov. 2, 1954 |
| 2,706,339 | Aller | Apr. 19, 1955 |
| 2,707,835 | Gierlich | May 10, 1955 |

FOREIGN PATENTS

| | | |
|---|---|---|
| 610,332 | Great Britain | Oct. 14, 1948 |

OTHER REFERENCES

Pub., Tooling and Production, October 1942, pages 80, 81, 126.